INVENTOR.
Leo D. Jones.
BY Maurice A. Crews
ATTORNEY.

July 20, 1937.  L. D. JONES  2,087,730
PROPORTIONATE FEED OF LIQUIDS AND GASES
Filed Oct. 18, 1933  2 Sheets-Sheet 2

INVENTOR.
Leo D. Jones
BY Maurice A. Crews
ATTORNEY.

Patented July 20, 1937

2,087,730

UNITED STATES PATENT OFFICE 2,087,730

PROPORTIONATE FEED OF LIQUIDS AND GASES

Leo D. Jones, Philadelphia, Pa., assignor to The Sharples Specialty Company, Philadelphia, Pa., a corporation of Delaware Application October 18, 1933, Serial No. 694,031

3 Claims. (Cl. 261—76)

The present invention relates to the art of proportionately feeding gases and liquids and it has as its object the provision of apparatus adapted to effect a feed of liquid into a flowing stream of gas in an amount which is accurately proportioned to the quantity of gas flowing in the stream. It was conceived with respect to the problem of impregnating heating and illuminating gas with an odorizing liquid by injection of the liquid into a main or conduit in which the gas flows.

It involves as a principal feature the provision of means for accurately adjusting the relative proportions in which the liquid and gas flow through the apparatus and of visual indicating means whereby the relative rates of flow may be accurately determined and the necessary adjustments of the apparatus made.

An auxiliary object of the invention has been to effect provision of novel and convenient means for refilling a service supply tank from which liquid is fed to the proportioning apparatus in a system of the type referred to above. Further objects and advantages of the invention will be in part obvious and in part pointed out in the following description of an illustrative embodiment when read in conjunction with the attached drawings, in which, Figure 1 is a side elevation of apparatus built in accordance with the invention.

Figure 1:
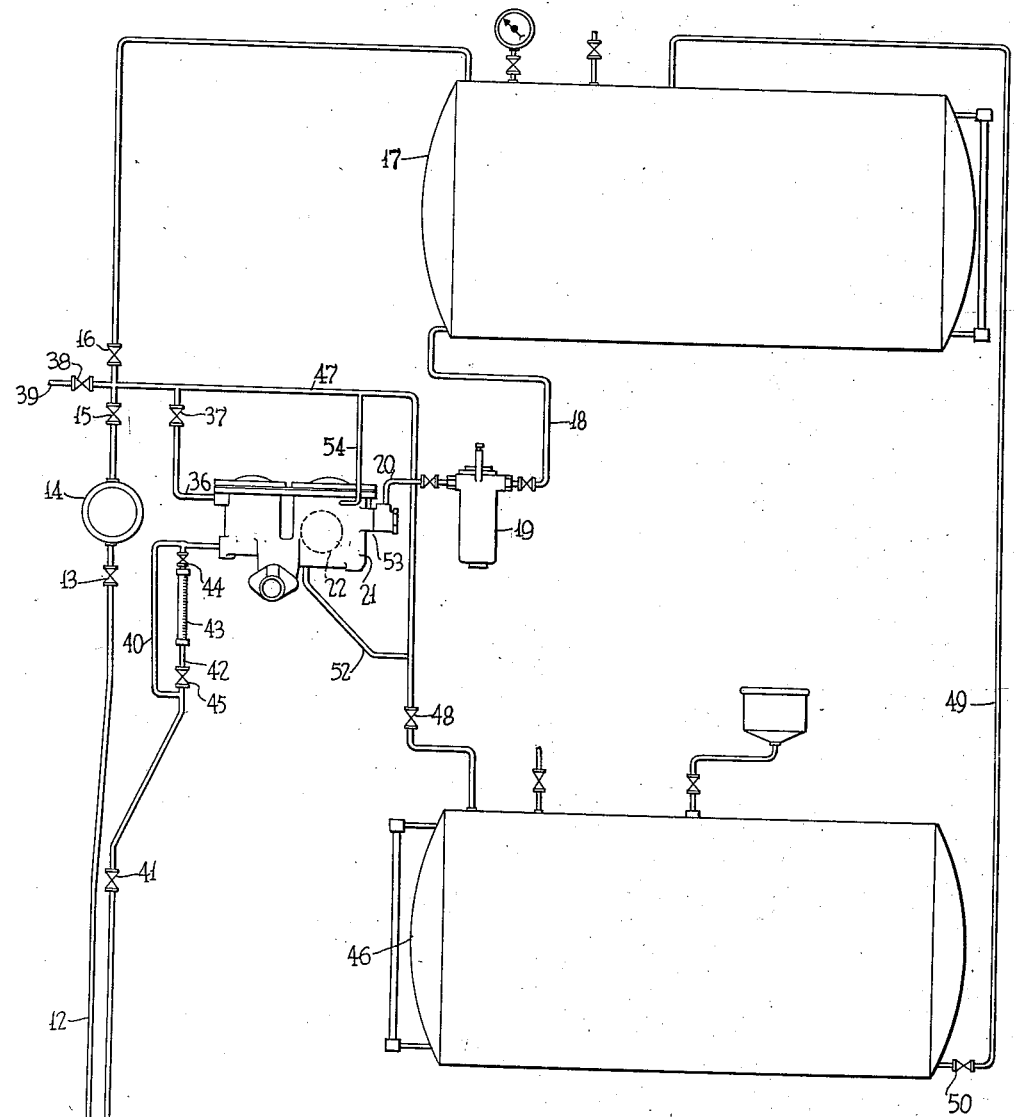

Referring to the drawings by reference numerals, the numeral 10 indicates a conduit through which a stream of gas is adapted to flow from a source of supply or storage. This conduit is provided at 11 with a conventional orifice plate or equivalent device adapted to cause a sudden drop of pressure between adjacent zones A and B of the gas main on opposite sides proportional to the rate of flow of gas through the conduit. By-pass conduit 12 leads from the high pressure zone A of the conduit through valves 13, 15 and 16 to the top of a service supply tank 17 which is adapted to contain a liquid, for example, an odorizing liquid adapted to be injected into the main 10. A dust filter 14 may be inserted into the conduit 12 for the purpose of purifying gas passing through this conduit.

Figure 2:
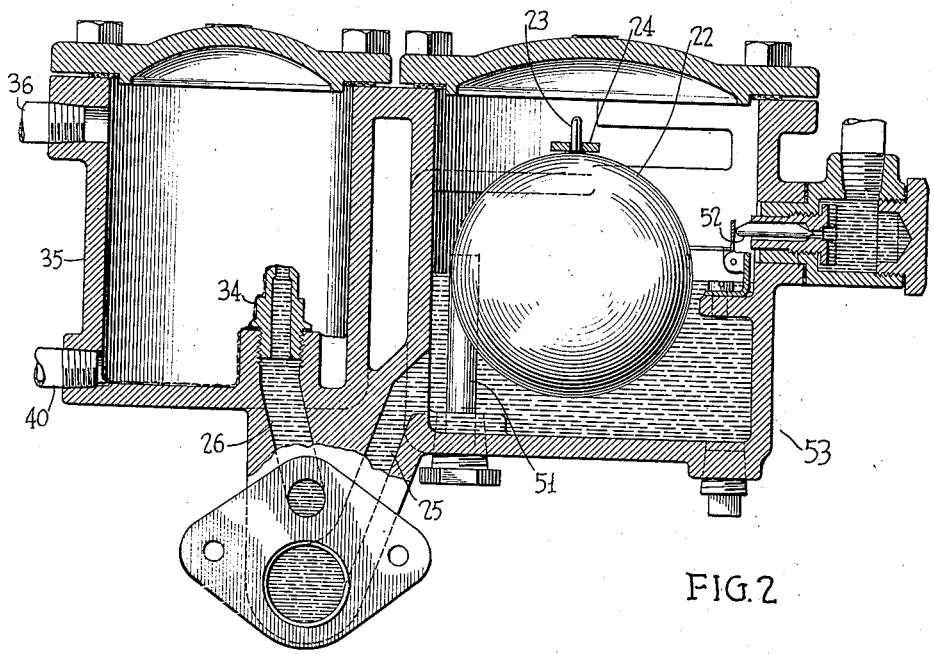
Figure 2 is a central vertical section through metering apparatus forming a part of the invention.

The service supply tank 17 communicates by means of a conduit 18 with a filter 19 adapted to effect purification of liquid flowing from the service supply tank into the gas main. The filter is connected with a metering apparatus, indicated generally at 53, by means of a conduit 20. The metering apparatus consists of a float chamber 21 which is connected with a chamber 35 by means of a passage or passages controlled by a needle valve. The level of the liquid in the float chamber 21 is controlled by a float 22 which in turn controls a valve 52 to prevent further flow of liquid through the conduit 20 to the float chamber when the liquid in that chamber has reached a predetermined level. The float 22 may be adjusted by suitable means to control the degree of its immersion within the liquid in the chamber 21 in the embodiment of the invention illustrated in Figure 2 of the drawings. A pin or lug is provided upon the top of the float 22 and one or more weights 24 are attached to the pin or lug for the purpose of causing the float to be immersed within the liquid in the float chamber to an extent depending upon the weight applied. It will, of course, be understood that the depth of liquid necessary to effect actuation of the valve 52 to prevent further feed to the float chamber is dependent upon the degree of immersion of the float within the liquid in that chamber and the adjustment of the weight applied to the pin or lug 23 thus effects an adjustment of the depth of liquid in the chamber 21 necessary to close the valve 52.

The chamber 21 is connected with a chamber 35 through passages 25 and 26 interconnected by a needle valve 27 formed in a housing 28, the passage 26 terminating in an apertured plug 34 which extends upwardly within the chamber 35 to a point affording a liquid level within passage 26 and plug 34 which is approximately at the controlled level of liquid within the chamber 21. The chamber 35 communicates through a conduit 36 and valve 37 with the conduit 12 when the valve 37 is opened. The conduit 12 also communicates with a vent conduit 39 which is controlled by a valve 38. The conduit 12 also communicates with the float chamber 21 through a branch 54 of a conduit 47 which interconnects the conduit 12 with an auxiliary storage tank to be hereinafter described. The chamber 35 is provided adjacent its bottom with a liquid discharge conduit 40 which is connected with the low pressure zone B of the gas main 10 by means of a valve 41.

In the normal operation of the apparatus described above, the valves 13, 15, 16 and 41 are retained open and the valves 37 and 38 are closed. Gas flowing in the main 10 causes a pressure differential between adjacent zones A and B and the pressure in the zone A is exerted through conduit 12 upon the liquid within the service supply tank 17 and thus causes liquid from that tank to flow through conduit 18, filter 19, and conduit 20 into the float chamber 21, the level which the liquid attains within the float chamber 21 being controlled by the valve 52 under the influence of the float 22. As explained above the height to which the plug 34 projects within the chamber 35 is approximately equal to the controlled depth of liquid within the float chamber 21. As consequence of this fact, no liquid will overflow the plug 34 under conditions in which the pressure within the chamber 35 is equal to or greater than the pressure within the float chamber 21. As stated above, however, in the normal operation of the apparatus the high pressure zone A of the conduit 10 communicates with the upper portion of the float chamber 21 through the branch 54 of the conduit 47 while the valve 37 is closed, and the valve 41 opened, thereby affording communication between the zone B of the conduit and the chamber 35 through the conduit 40. Since the pressure within the chamber 35 is thus controlled by the pressure at B in the conduit and the pressure in chamber 21 is controlled by the pressure at A, there will be no flow of liquid from the chamber 21 to the chamber 35 unless there is flow of gas in the main 10, for unless there is gas flow no differential of pressure will exist between zones A and B. On the other hand, when gas flows through the main 10, a pressure differential will exist between zones A and B which is approximately proportional to the rate of flow of gas through the main 10. The pressure differential between the chambers 21 and 35 will therefore be governed by the rate of flow of gas through the main and liquid will be forced through the passage 25, needle valve 27 and passage 26 in an amount accurately proportioned to the pressure differential existing between zones A and B and hence to the rate of flow of gas through main 10. Gas overflowing the plug 23 will thus flow by gravity through the conduit 40 to the low pressure zone B of the conduit in a volume which is proportioned to the rate of flow of gas through the main 10.

Figures 3, 4:
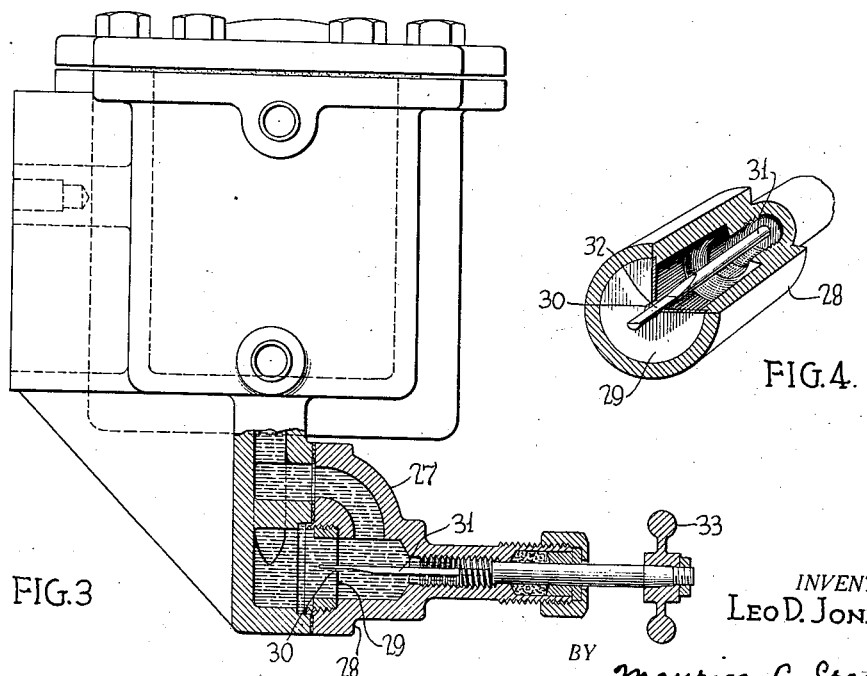
Figure 3 is a detailed side elevation taken at right angles to Figure 2 and illustrating parts of the apparatus in section.
Figure 4 is a detailed sectional view illustrating the construction of a needle valve forming a part of the metering apparatus.

An important feature of the invention consists in the structure of the needle by which the rate of flow through the orifice of the needle valve 27 is adjusted. In conventional needle valve construction, a round pointed needle controls the flow of liquid through the valve mechanism. Where, as in the present instance it is desired to control the flow of a liquid through a needle valve at a very gradual rate, the control of such flow necessarily entails a very great restriction of the needle controlled orifice through which the liquid flows. The control of such an orifice by a needle of circular cross section entails the flow of an annular stream of liquid through such orifice, and the annular cross section of the liquid passing through the orifice involves restriction of the width of the stream adjacent any particular radius of the needle to such an extent as to create capillary effects and danger of cloggage which render the metering of the liquid inaccurate. In order to avoid such effects, I utilize a flexible needle 31 which has a portion of its circumference arranged tangentially to the orifice 30 in the disc 29 through which the liquid flows, this portion of the circumference of the needle being resiliently held against the opening by reason of its natural resilience. In the particular embodiment illustrated in the drawings, the needle instead of being formed of tapering cylindrical cross section, is provided with a flat side 32 which is tapered to afford the desired orifice adjustment upon the projection of the needle to a greater or less degree through the orifice 30 by the manipulation of the handle 33. By reference to Figure 3 it will be seen that this arrangement affords a flow of liquid past the needle in a single undivided body instead of in an annular body as would be involved in the application of a conventional needle valve of the prior art to the problem.

Another important feature of the invention consists in the provision of means for measuring the rate of flow of liquid in the operation of the apparatus. These means include a by-pass conduit 42 provided with a graduated glass gauge 43, the flow of liquid into this by-pass conduit being controlled by valves 44 and 45. When it is desired to ascertain the rate of flow of liquid in response to a given gas flow in the main 10, it is only necessary to close the valve 45 and open the valve 44, thereby allowing the liquid to flow into the by-pass conduit 42 and gradually fill this conduit. By comparing the rate of flow of the liquid into this conduit as the level rises along the gauge 43 with the time required for such liquid to accumulate, an accurate measure of the proportioned rate of liquid flow to gas flow may be obtained. In the normal operation of the device, after the liquid flow has been ascertained and the necessary arrangement of the metering apparatus made to effect the desired proportionate rate of flow, the valves 44 and 45 are closed and the metered liquid allowed to flow through the conduit 40 and valve 41 into the main 10.

In the preferred form of the invention, novel means are provided for the purpose of facilitating the refilling of the service supply tank 17. Such means include an auxiliary storage tank 46 which is connected with the conduit 12 by means of conduit 47 and valve 48 and a conduit 49 interconnecting this tank 46 with the service supply tank 17 by means of a valve 50. When it is desired to refill the tank 17 from the tank 46, tank 17 is vented and tank 46 is closed to the atmosphere, valves 13, 15, 48 and 50 are opened and valves 16, 37 and 38 are closed. Under these conditions, when gas flows through the main 10, pressure from the high pressure zone A of the main is exerted through conduits 12 and 47 upon liquid within the auxiliary storage tank 46 to cause that liquid to flow through the valve 50 and conduit 49 into the service supply tank 17 to effect refilling thereof.

In the apparatus as above described, serious difficulty might be encountered in connection with failure of the float 22 to operate the valve 52 to effect discontinuance of feed of liquid to the float chamber 21 when the liquid in that chamber reaches the predetermined level at which closure of said valve is intended to occur in the normal operation of the device. If, under such conditions, liquid were allowed to continue to accumulate within the float chamber 21 it would exert an overbalancing effect upon the liquid in the passage 26 and plug 34, thereby causing liquid to flow into the chamber 35 and from this chamber into the main 10 at a rate greatly in excess of the intended proportion. In order to obviate such an accident, I have provided an overflow pipe 51 within the float chamber 21 extending upwardly within that chamber to a point slightly above the intended liquid level within that chamber and this overflow pipe is connected with the auxiliary supply pipe 46 by means of conduit 52 which communicates with conduit 47 and delivers liquid overflowing through the pipe 51 into the auxiliary storage tank 46. This arrangement prevents the accumulation of such liquid to a depth which might cause an unduly excessive feed of liquid and thus obviates the danger referred to above.

Modifications will be obvious to those skilled in the art and I do not therefore wish to be limited except by the interpretation of the sub-joined claims in the light of this broad spirit of the invention.

I claim:

1. A needle valve for controlling the rate of flow of liquid through a conduit comprising in combination a perforated member and a flexible needle adapted to control the flow of liquid through said perforated member, said needle having a substantial portion of its periphery arranged concentrically with respect to the opening in said perforated member in abutting relationship thereto.

2. In apparatus for injecting liquid into a flowing stream of gas, the combination comprising a conduit through which a stream of gas is adapted to flow, a source of liquid supply, and means interconnecting said source of liquid supply and a zone of injection of liquid into said gas conduit including a needle valve for controlling the rate of flow of liquid to said conduit, said needle valve comprising a perforated member and a flexible needle adapted to control the flow of liquid through said perforated member, said needle having a substantial portion of its periphery arranged concentrically with respect to the opening in said perforated member in abutting relationship thereto and pressed thereagainst by its flexibility, whereby an accurately controlled flow of liquid to said gas conduit may be maintained.

3. In apparatus for injecting liquid into a flowing stream of gas, the combination comprising a conduit through which a stream of gas is adapted to flow, a source of liquid supply, means interconnecting said source of liquid supply and said conduit including a float chamber communicating with a high pressure zone of said conduit, a second chamber interposed between said float chamber and the zone of injection of liquid into the gas conduit, a conduit interconnecting said chambers and including a passage extending upwardly into said second chamber for a sufficient distance to effect substantial liquid balance between liquid in the float chamber and liquid in said interconnecting conduit, means interconnecting said second chamber with a low pressure zone of said gas conduit whereby to afford a differential pressure upon the liquid in the upwardly extending column of said interconnecting conduit and the liquid of said float chamber, and a needle valve interposed in the conduit interconnecting said float chamber and said second chamber, said needle valve comprising a perforated member and a flexible needle adapted to control the flow of liquid through said perforated member, said needle having a substantial portion of its periphery arranged concentrically with respect to the opening in said perforated member in abutting relationship thereto and pressed thereagainst by its flexibility, whereby an accurately controlled flow of liquid may be maintained.

LEO D. JONES.